United States Patent [19]

Ng et al.

[11] Patent Number: 4,965,144

[45] Date of Patent: Oct. 23, 1990

[54] RELEASABLE PRESSURE VENTS

[75] Inventors: Andrew S. O. Ng, Jardine's Lookout; Peter P. T. Ling, Kowloon, both of Hong Kong

[73] Assignee: Sylvia Industries Ltd., New Territories, Hong Kong

[21] Appl. No.: 446,046

[22] Filed: Dec. 5, 1989

[30] Foreign Application Priority Data

Sep. 29, 1988 [GB] United Kingdom ............... 8822836

[51] Int. Cl.$^5$ ............................................. H01M 2/12
[52] U.S. Cl. ..................................................... 429/55
[58] Field of Search .................................. 429/53–56, 429/72

[56] References Cited

U.S. PATENT DOCUMENTS

| | | | |
|---|---|---|---|
| 2,307,768 | 1/1943 | Deibel | 429/54 |
| 3,293,081 | 12/1966 | Daley | 429/55 |
| 3,556,863 | 1/1971 | Nathe | 429/55 |
| 3,579,387 | 5/1971 | Voyentzie et al. | 429/55 |
| 3,622,397 | 11/1971 | Belove | 429/55 |

Primary Examiner—Anthony Skapars
Attorney, Agent, or Firm—Laurence R. Brown

[57] ABSTRACT

A resealable pressure vent for a container such as a battery container having a wall containing an aperture connecting the interior of the container with the atmosphere comprising a cover member in the form of a metal plate which is spot welded at its center to the center of the wall of the container. The aperture is located in the wall away from the center thereof and an elastic O-ring is interposed between the metal plate and container wall such that the O-ring seals the aperture from the exterior of the container. In the event of excess pressure within the container, the O-ring is displaced by the said excess pressure to vent the container and the O-ring returns to its original sealing position when the excess pressure is relieved.

9 Claims, 2 Drawing Sheets

RELEASABLE PRESSURE VENTS

BACKGROUND OF THE INVENTION

This invention relates to a resealable pressure vent for a container and more particularly for venting a battery container.

In the manufacture of rechargeable batteries, especially nickel cadmium cells, a safety vent is generally provided to release any abnormal pressure which might develop in the cell during charging or abuse of the battery.

Vents for battery cells are known and fall into two main categories, "one-time" or "resealable". The "one-time" vent is of simple design and comprises weakened areas in the battery casing, when the internal gas pressure in the battery reaches a predetermined venting pressure, the weakened area is punctured thereby protecting the battery from exploding.

The main disadvantage of the "one-time" design is that once the vent is punctured, the interior of the battery becomes exposed to the atmosphere and the battery quickly dries up or fails because of carbonation. Of the two, the preferred safety vent is the "resealable" design.

The "resealable" vent is generally provided with an elastic element such as a spring or a rubber ball which will release the excess pressure inside the battery. Furthermore, after the excess pressure is released, the elastic element recovers its original state or form and reseals the battery. The battery continues to function although possibly at a slightly deteriorated rating.

SUMMARY OF THE INVENTION

The object of the present invention is to provide a resealable pressure vent for containers which overcomes or mitigates the above-mentioned disadvantages of "one-time" vents.

According to the present invention, there is provided a resealable pressure vent for a pressurized container having a wall containing an aperture connecting the interior of the container with the atmosphere, said releasable pressure vent comprising a cover member adapted to close the aperture and comprising a metal plate spot welded at its center to said wall of the casing and an elastic O-ring located between the wall of the container and the cover member such that the O-ring encircles the spot welded center of the metal plate and the aperture, the O-ring serving to seal the aperture from the exterior of the container and being displaceable by an excess of pressure in the container to vent the interior before returning to its sealing position when the excess pressure is relieved.

According to one embodiment of the present invention the resealable pressure vent is incorporated in an electric battery container.

According to a further preferred embodiment of the present invention the resealable pressure vent is incorporated in the container of a nickel cadmium battery cell.

Preferably, the metal cover plate is located in a recess in the container wall such that it lies flush with the container wall exterior.

In a preferred construction the resilient O-ring is made from Butyl rubber with a hardness of 60 to 75 shore A and has a cross-sectional diameter in the uncompressed condition of 1 mm.

The cover member for the vent is preferably made of 0.30 mm nickel plated steel with a gap of 0.5 mm between the container wall and the cover member.

The venting pressure is ideally from 15 to 16 Kg/cm$^2$.

BRIEF DESCRIPTION OF THE DRAWINGS

The invention will now be further described with reference to the drawings, in which.

DESCRIPTION OF PREFERRED EMBODIMENTS

Figure 1:
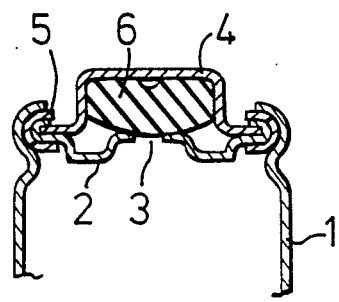
FIG. 1 is a diagrammatic cross-section of the top portion of a nickel cadmium battery cell incorporating a prior art "resealable" pressure vent.

The nickel cadmium battery cell shown in FIG. 1 comprises a cylindrical casing 1 having an end wall 2 with a central vent hole 3 and a cathode cell cap 4. The peripheral edges of the end wall and cap are crimped by the end of the cylindrical casing with the interposition of an annular insulating washer 5. The vent hole 3 is sealed by an elastic rubber member 6.

Figure 2:
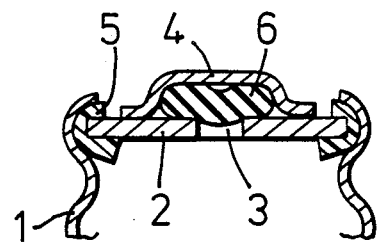
FIG. 2 is a similar view to FIG. 1 of a second prior art "resealable" pressure vent.

FIG. 2 shows another prior art construction similar to FIG. 1 where like parts have the same reference numerals. The cathode cell cap 4 is welded to the end wall 2 instead of being crimped by the casing 1 and the annular insulating washer 5.

Figure 3:
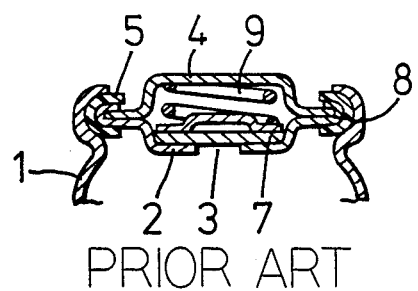
FIG. 3 is a similar view to FIGS. 1 and 2 of an alternative prior art construction of a "resealable" pressure vent.

The prior art sealable pressure vent cell construction shown in FIG. 3 has a similar construction to that shown in FIG. 1 where like parts have the same reference numerals. The end wall 2 is dished to receive a displaceable plate 7 with a locating member 8 for a coil spring 9 covered with a plastic coating.

The above three embodiments all share one common factor in that the vent hole is directly covered by an elastic element which affects the vent pressure and is dependent on the size of the vent hole. This type of vent arrangement generally requires a quite sizeable volume and a high profile so as to allow for the compression of the elastic element. The size and surface finish of the vent hole is very critical for reproducible results in mass production.

Figure 4:
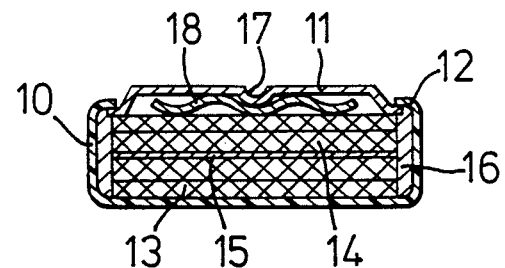
FIG. 4 is a cross-section of a nickel cadmium battery button cell of a common construction which does not have a safety vent.

The prior art construction shown in FIG. 4 illustrates a typical nickel cadmium button cell. These are electrochemical cells which have a large diameter to height ratio. Their external shape has the appearance of coins and they are sometimes referred to as coin cells. The button cell shown in FIG. 4 comprises a metal cup 10 which serves as the anode and a metal cap 11 which serves as the cathode separated by an insulator 12 of plastic material which is compressed to seal the battery against leakage. The cell contains a screen wrapped positive electrode 13 and a screen wrapped negative electrode 14 separated by an absorber layer 15 and surrounded by a gasket 16. The cathode metal cap 11 has a central depression 17 which locates a contact spring 18 which makes an electrical connection with the negative cell electrode.

Although simple in construction and easy to mass produce, hermetically sealed cells such as these tend to burst open explosively when they are charged at an excessively high rate, overcharged at excessively high rate, prolonged reverse-charge at a high rate or disposed of in a fire. Such disadvantages limit the popularity of these button cells.

Figure 5A:
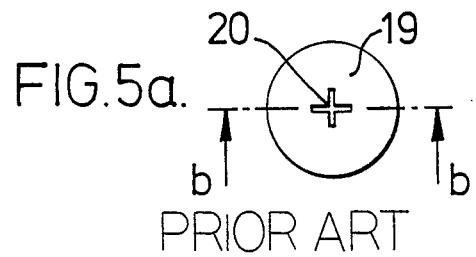
FIGS. 5a to 5c are detailed views showing a prior art construction of a "one-time" weakened cell wall of a nickel cadmium button cell.
Figure 5B:
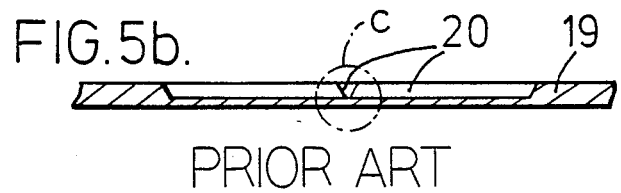
Figure 5C:
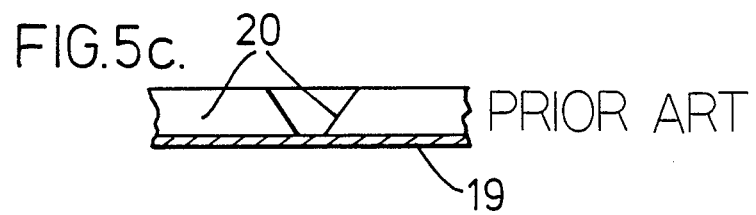

To overcome these disadvantages a "one-time" seal is also currently used as illustrated in FIGS. 5a to 5b. The anode plate 19 is formed with a heavily indented "+" depression 20 at the base of the cell cup. This heavily indented area reduces the metal thickness to about 20% of the nominal thickness of the cup. As the internal pressure builds up, the bottom of the cell cup swells and cracks open at the weakened area, thereby releasing the excess pressure.

This "one-time" vent, although simple in concept is very difficult to implement, for example, if the indent is made slightly too deep, the vent could prematurely operate during normal usage, rendering a new battery unserviceable. If the indent is too shallow because of tool wear, the vent might not operate properly resulting in a dangerous condition.

Figure 6:
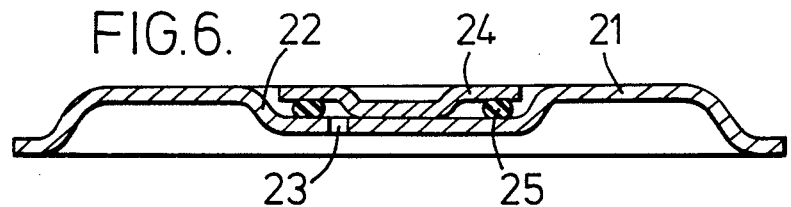
FIG. 6 is a fragmentary cross-section of a resealable pressure vent according to one embodiment of the present invention.

One embodiment of an improved resealable pressure vent according to the present invention is illustrated in FIG. 6 which shows a cross-section of a cathode cell cap 21 formed with a central depression 22 and a vent hole 23 off-set from the center of the depression. Spot welded to the center of the depression 22 is a cover plate 24 covering the vent. To seal the vent an elastic O-ring 25 is compressed between the cover plate 24 and the depression 22 in the cathode cell cap 21. The O-ring encompasses the vent hole 23 to seal the vent from the atmosphere.

The size of the vent hole 23 is not very significant as it does not affect the vent pressure.

The dimension of the O-ring is chosen so as to be in a state of compression when the vent cover plate 24 is welded in place. A reduction of 30 to 60% in cross-sectional diameter of the O-ring is considered sufficient and the diameter is chosen to allow for easy welding of the vent cover plate and to accommodate the placement of the vent hole.

In operation when the pressure in the cell increases, this increase is transmitted to the O-ring 25 through the vent hole 23. The diameter of the O-ring increases in response to increasing pressure, which has the effect of reducing the cross-sectional diameter of the rubber O-ring. When the cross-sectional diameter of the O-ring becomes reduced to the point where it can no longer accommodate the cell pressure the excess pressure is vented, whereupon the O-ring seal snaps back to its original dimension resealing the vent. By choosing different hardness of rubber, different cross-sectional diameter, different sizes of O-ring as well as different dimensions of the vent cover plate, the cell venting pressure can be varied as desired.

In the releasable pressure vent for the nickel cadmium button cell the O-ring is ideally made of Butyl rubber with a hardness of 60 to 75 shore A and a cross-sectional diameter of 1 mm. The vent cover plate is suitably made of 0.30 mm nickel plated steel with the gap between the cell cap and the cover plate of 0.5 mm to compress the O-ring. The resulting pressure vents at a relief pressure of 15 to 16 Kg/cm$^2$.

Figure 7:
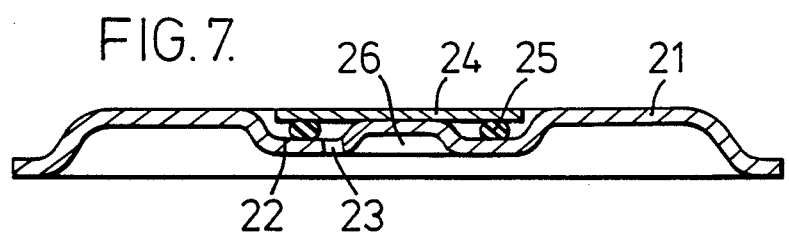
FIG. 7 is a similar view to FIG. 6 of an alternative embodiment of a resealable pressure vent according to the present invention.

In the alternative embodiment shown in FIG. 7, the resealable pressure vent according to the invention is similar to that shown in FIG. 6 and like parts have the same reference numerals. This construction differs in that the cover plate 24 is a flat disc flush with the upper wall of the cell cap 21. The cell cap depression 22 has a central upwardly extending depression 26 which is spot welded to the cover plate 24. As in the embodiment of FIG. 6 the O-ring 25 encompasses the vent hole 23 to seal the vent from the atmosphere.

Although the resealable pressure vent according to the invention has been described for use in the container of a battery cell, it is to be understood that it can be incorporated into any convenient flat surface of any pressurized container.

Further, the invention is not restricted to the above described embodiment but variations and modifications may be made without departing from the spirit and scope of the invention as defined by the appended claims.

We claim:

1. A resealable pressure vent for a pressurized container having a wall containing an aperture connecting the interior of the container with the atmosphere, said resealable pressure vent comprising a cover member adapted to close the aperture and comprising a metal plate spot welded at its center to said wall of the container and an elastic O-ring compressed between the wall of the container and the cover member such that said O-ring encircles the spot welded center of the metal plate and the aperture, the O-ring serving to seal the aperture from the exterior of the container by its compression between the wall and the plate and being displaceable by an excess of pressure in the container to vent the interior for returning to its sealing position when the excess pressure is relieved by snapping back toward its original diameter.

2. A resealable pressure vent as claimed in claim 1, in which the metal plate is located in a recess in the container wall such that its center lies flush with a container wall exterior.

3. A resealable pressure vent as claimed in claim 2, in which a central region of the metal plate is depressed with respect to peripheral regions of said plate to form a gap between the peripheral regions of the plate and the container wall, said O-ring being located in said gap.

4. A resealable pressure vent as claimed in claim 2, in which a central region of the recess in the container wall is raised from the remainder of the recess, the metal plate is substantially planar and its center is welded to the central raised region of the recess to define a gap between the plate and the remainder of the recess, said O-ring being located in said gap.

5. A resealable pressure vent as claimed in claim 1, in which the cover member is made of 0.30 mm nickel plated steel with a gap of 0.5 mm between the container wall and the cover member for receiving said O-ring.

6. A resealable pressure vent as claimed in claim 5, in which the O-ring is made from butyl rubber with a hardness of 60 75 shore A and has a cross-sectional diameter in the uncompressed condition of 1 mm.

7. A resealable pressure vent as claimed in claim 1, in which the venting pressure is arranged to be from 15 to 16 kg/cm$^2$ by means of O-ring characteristics.

8. A resealable pressure vent as claimed in claim 1, in which the container is an electric battery container.

9. A resealable pressure vent as claimed in claim 1, in which the container encloses a nickel cadmium battery cell.

* * * * *